Patented Aug. 9, 1938

2,125,924

UNITED STATES PATENT OFFICE 2,125,924

SULPHUR COLORS BY THIONATION

Alfred J. Johnson, Woodstown, N. J., and George C. Strouse, Wilmington, Del., assignors to E. I. du Pont de Nemours & Company, Wilmington, Del., a corporation of Delaware No Drawing. Application November 13, 1936, Serial No. 110,642

9 Claims. (Cl. 260—19)

This invention relates to new sulphur colors and to methods of their production, especially to the products produced by thionation of sulphur color intermediates in a reaction medium containing an alkali-metal polysulphide solution, water in excess of that contained in the alkali sulphide crystals and a suitable solvent, such as a mono-alkyl-ether of ethylene glycol.

Heretofore sulphur colors have been made by thionation in a menstruum or reaction media, sometimes considered a fusion, containing sodium polysulphide and mono-ethyl-ether of ethylene glycol. If possible, water was excluded from the reaction medium, or less water than that present as water of crystallization in the sodium sulphide, $Na_2S \cdot 9H_2O$ was present. Cyclohexanol and alcohol have also been used as solvents in such processes with the indicated small amounts of water, or without water. The products produced by thionations in such anhydrous or nearly anhydrous solutions contained tar substances and the sulphur color products had a dullness which was undesirable.

Heating for long periods of time, or the use of too high temperatures, or both, were also necessary to obtain the desired thionation. When an organic solvent was not present, the low solubility in water of the intermediates to be thionated necessitated an uneconomically slow reaction which resulted in the formation of by-products that gave dullness, weakness of color and poor solubility to the thionated product. Alcohol mixtures had too low boiling points and their presence made the reaction slow and the product imperfect. The limited solubility of cyclohexanol and its homologues in alkali metal polysulphides limited its effectiveness. The yields of the products heretofore obtained were undesirably low and for other reasons which will be apparent from the description of applicants' invention, it was desirable to provide new and improved products and processes.

It is an object of this invention to provide new and improved sulphur colors. A further object is to provide new thionating processes. Another object is to provide more homogeneous thionation masses. Other objects are to improve the colors and to obtain the colors in good yield. A further object is to provide methods of producing sulphur colors whereby thionation can be carried out at suitable temperatures and economies in the production of such colors can be effected. Still other objects will be apparent from the following description of the invention.

The objects of the invention are attained generally by thionating in a reaction medium containing an alkali metal polysulphide and a solvent, such as "Cellosolve" (a mono-alkyl-ether of ethylene glycol) which is diluted with water to the extent that the reaction mixture contains an excess of water over that which would be present if $Na_2S \cdot 9H_2O$ and sulphur were used to supply the polysulphide content. Accordingly thionations can be carried out on dried intermediates or upon undried intermediates. In the use of undried intermediates, such as leuco indophenols which are difficult and costly to dry without decomposition, a part or all of the added water can be supplied with the wet intermediate, and in such a procedure the decomposition incident to drying is avoided and the additional improved yield and quality of product resulting from the thionation in the diluted aqueous reaction mixture are attained. The addition of water to the solvent-containing thionating reaction mixture imparts a beneficial solubilizing action on the intermediate to be thionated and also on the preliminary thionation products, thereby providing improved thionating conditions without markedly changing the reflux temperatures. Reaction mixtures containing suitable solvents and the indicated excess of water to give boiling points of about 103° to about 125° C. have been found to decrease the production of undesirable products and to improve the production of desired products. In thionating intermediates which can be effectively and rapidly thionated at lower temperatures, reaction media boiling at about 103° to about 110° C. are preferred.

The manner in which the invention is carried out is illustrated but not limited by the following examples.

*Example I.*—A polysulphide solution was prepared by heating 85 parts by weight of sodium sulfide crystals ($Na_2S \cdot 9H_2O$), 42 parts of sulphur, 60 parts of water and 14 parts of the mono-ethyl-ether of ethylene glycol, under reflux until solution was complete. This solution contained about 58% water and about 7% "Cellosolve". 25 parts of 2,4-dinitro-2'-hydroxy-diphenyl-amine were added and the mixture heated at the boiling point, about 105–106° C., under reflux for about 12 hours. The resulting thionation mass then was diluted and the crude color precipitated by air or salted out. The crude color then was finished by further treatment with air or other oxidizing agents. The product was a dark bronzy powder which dyed cotton from sodium sulphide solution in bright shades of blue. Without the use of "Cellosolve" dull, greenish shades of blue were obtained. By using a high concentration of "Cellosolve" and a concentration of water less than that which would have been present if no water had been added to the reaction mixture, considerably redder shades were obtained and the colors were less fast to washing and light.

*Example II.*—A polysulphide solution was prepared refluxing a mixture of 120 parts sodium sulphide crystals ($Na_2S \cdot 9H_2O$), 74 parts sulphur and 116 parts "Cellosolve" until the sulphur was dissolved. The solution then was cooled to about 60° C. and 290 parts of wet press cake containing 41.25 parts of the leuco indophenol obtained by the reduction of the indophenol made by the oxidation of a mixture of Cleve's acid and para-aminophenol were added. The solution contained about 52% water and about 20% "Cellosolve". The mixture was heated to the boiling point, 104-105° C., and refluxed for 20 hours. The thionation mixture was diluted and the color was precipitated by means of air or by salting out. The color was improved by further blowing with air in alkaline suspension. A dark colored powder dyeing cotton from sodium sulphide solution in bright bluish green shades was obtained. By adding copper or copper salts to the thionation mass dyes of considerably yellower shades were obtainable. Thionation of the above intermediate without "Cellosolve" required about 70 hours and a lower yield of an undesirable yellower and duller product was obtained.

*Example III.*—A sodium polysulphide solution was prepared by refluxing 100 parts sodium sulphide crystals, 75 parts sulphur and 116 parts "Cellosolve" until the sulphur was dissolved. The solution was cooled to about 60 C. and 120 parts of wet press cake containing 50 parts of the leuco indophenol from phenylperi-acid and p-aminophenol were added. This reaction mixture contained about 33% $H_2O$ and about 28% "Cellosolve". The resulting mixture was boiled under reflux, boiling point 107-109° C., for 22 hours. The thionation mass was diluted with water and the color precipitated by means of air or by the addition of salt. The product was a dark greenish powder which dyes cotton from a sodium sulphide bath in bright yellowish green shades. Without the use of "Cellosolve" and added water the thionation was very much slower, requiring about 60 hours, and a lower yield of an inferior product was obtained.

By thionation in alcoholic polysulphide reaction medium some improvement in shade and yield over aqueous thionation was possible, but the time of thionation was considerably longer than was necessary in accordance with the invention, about 72 hours being required. The product was inferior in quality, being bluer and duller than that obtained in the presence of "Cellosolve", and the yield was lower. The addition of copper or copper compounds to the thionation mixtures gave dyes of considerably yellower shades of green.

Although preferred conditions are given in these examples, the operative limits of this invention are not limited thereto. The water content of the reaction medium can be varied from about 25% to about 75% with good results. Indophenols can be used instead of leuco indophenols. The composition of the polysulphide, temperature and time of thionation, the solvent content and methods of isolation of the colors can be varied within rather wide limits without affecting the improvement in the products obtained. In addition to the intermediates given in the examples a large number of other intermediates giving sulphur colors by thionation can be used, such as the other indophenols, the hydroxy-aromatic amines, and the hydroxy-amino-phenazines. This process is especially useful in shortening the time of thionating intermediates whose solubility in alkali-metal polysulphides is improved by the addition of solvents, such as "Cellosolve". Other mono-alkyl-ethers of ethylene glycol or diethylene-glycol can be used instead of "Cellosolve". The alkali-metal polysulphide can be prepared by other known methods such as the polysulphide prepared from sodium sulphide flakes (60%) and sulphur or the polysulphide prepared from caustic soda and sulphur. A part or all of the solvent can be recovered, if desired, by carrying out a distillation during the thionation or after the color formation is complete. The reaction medium may contain widely varying proportions of the solvent since the solvents used in accordance with this invention are soluble in all proportions in the alkali metal polysulphides.

In general the dyes made by this process are different in shade from those made in aqueous polysulphide solutions without solvent, and in solutions containing solvent and without water or with a deficiency of water. Indications point to the fact that the new products are freer from impurities than the products of the prior art. But apart from their higher purity it is our present belief that the new products are different from those made by prior processes as indicated by differences in color, but it is to be understood that no limitation of the invention is intended by the suggested theory.

This invention provides efficient means for carrying out the thionation of intermediates for sulphur colors which are difficult to thionate because of their sparing solubility or because of their tendency to form tarry masses in aqueous polysulphide solutions. The products are obtained under comparatively mild thionating conditions and are in purer form and in higher yields than products produced heretofore under more drastic conditions and with less efficient solvents. The organic solvents are readily recovered and do not give rise to the undesirable features encountered when other volatile organic solvents, such as alcohol are used.

As many other and widely different embodiments will be apparent to those skilled in the art without departure from the spirit and scope of the invention, it is to be understood that no limitations are intended except such as are specifically recited in the claims or are imposed by the prior art.

We claim:

1. The method of thionating intermediates for sulphur colors which comprises making a reaction medium having a boiling point from about 103° to about 125° C. by mixing an alkali metal polysulphide containing water in excess of that which would be contained in the $Na_2S \cdot 9H_2O$ content of a sodium polysulphide medium of equal alkali and sulphur content and a solvent selected from the group consisting of a mono-alkyl-ether of ethylene glycol and diethylene glycol, and heating said intermediate in said reaction medium and at about the boiling point thereof until the intermediate is thionated.

2. The method of making a sulphur dyestuff which comprises adding a sulphur color intermediate to a reaction medium containing an alkali metal polysulphide, about 25% to about 75% water and a solvent selected from the group consisting of a mono-alkyl-ether of ethylene glycol and di-ethylene glycol, and heating until the intermediate is thionated.

3. The method of making a sulphur dyestuff which comprises adding a sulphur color intermediate to a reaction medium containing an alkali metal polysulphide, about 25% to about 75% water and a solvent selected from the group consisting of a mono-alkyl-ether of ethylene glycol and di-ethylene glycol, and heating at the boiling point of the reaction medium until the intermediate is thionated.

4. In the method of thionating a sulphur color intermediate by heating the intermediate in an alkali metal polysulphide thionating medium until a sulphur color is produced, the step which comprises heating the intermediate at about the boiling point of a reaction medium having a boiling point about 103° to about 110° C. and containing an alkali metal polysulphide, a mono-alkyl ether of ethylene glycol and water in excess of that which would be contained in the $Na_2S \cdot 9H_2O$ content of a sodium polysulphide medium of equal alkali and sulphur content.

5. In the method of thionating a sulphur color intermediate by heating the intermediate in an alkali metal polysulphide thionating medium until a sulphur color is produced, the step which comprises heating the intermediate at about the boiling point of a reaction medium having a boiling point about 103° to about 110° C. and containing an alkali metal polysulphide, a mono-ethyl ether of ethylene glycol and water in excess of that which would be contained in the $Na_2S \cdot 9H_2O$ content of a sodium polysulphide medium of equal alkali and sulphur content.

6. In the method of thionating a sulphur color intermediate by heating the intermediate in an alkali metal polysulphide thionating medium until a sulphur color is produced, the step which comprises heating the intermediate at about the boiling point of a reaction medium having a boiling point about 103° to about 110° C. and containing an alkali metal polysulphide, di-ethylene glycol and water in excess of that which would be contained in the $Na_2S \cdot 9H_2O$ content of a sodium polysulphide medium of equal alkali and sulphur content.

7. The method of making a sulphur dyestuff which comprises adding a leuco indophenol admixed with water to a reaction medium containing sodium polysulphide and a solvent selected from the group consisting of a mono-alkyl-ether of ethylene glycol and di-ethylene glycol, said mixture containing more water than that which would be contained in a reaction mixture of equal alkali metal polysulphide content derived from $Na_2S \cdot 9H_2O$, and heating the reaction mixture at about its boiling point until the intermediate is thionated.

8. The dyestuff made by thionating the leuco indophenol obtained by the reduction of the indophenol made by the oxidation of a mixture of Cleve's acid and para-aminophenol, said thionation being conducted in a reaction medium having a boiling point of about 103° to about 110° C. and containing sodium polysulphide, an excess of water over that which would be contained in the $Na_2S \cdot 9H_2O$ content of a sodium polysulphide medium of equal alkali and sulphur content and a solvent selected from the group consisting of a mono-alkyl-ether of ethylene glycol and di-ethylene glycol, heating at about the boiling point of the mixture until the intermediate is thionated, and then separating the dyestuff from the reaction medium, said dyestuff being a bronzy powder which dyes cotton in bright bluish green shades, and being substantially devoid of tarry substances.

9. The dyestuff made by thionating the leuco indophenol obtained by reducing the indophenol which is made by oxidizing a mixture of phenyl-peri-acid and para-amino-phenol said thionation being conducted in a reaction medium having a boiling point of about 103° to about 110° C. and containing sodium polysulphide, an excess of water over that which would be contained in the $Na_2S \cdot 9H_2O$ content of a sodium polysulphide medium of equal alkali and sulphur content and a solvent selected from the group consisting of a mono-alkyl-ether of ethylene glycol and di-ethylene glycol, heating at about the boiling point of the mixture until the intermediate is thionated, and then separating the dyestuff from the reaction medium, said dyestuff being a bronzy powder which dyes cotton in bright yellowish green shades, and being substantially devoid of tarry substances.

ALFRED J. JOHNSON.
GEORGE C. STROUSE.